United States Patent [19]

Makita et al.

[11] Patent Number: 5,228,766
[45] Date of Patent: Jul. 20, 1993

[54] AUTOMOTIVE HEADLAMP

[75] Inventors: Hiroyuki Makita; Akiyoshi Ozaki, both of Shizuoka, Japan

[73] Assignee: Koito Manufacturing Co., Ltd., Tokyo, Japan

[21] Appl. No.: 945,606

[22] Filed: Sep. 16, 1992

[30] Foreign Application Priority Data

Sep. 24, 1991 [JP] Japan .................................. 3-243167

[51] Int. Cl.$^5$ ......................................... B60Q 1/00
[52] U.S. Cl. ...................................... 362/61; 313/318
[58] Field of Search ........................... 362/61; 313/318

[56] References Cited

U.S. PATENT DOCUMENTS 4,814,959 3/1989 Chakrabarti ........................... 362/61
5,118,990 6/1992 Makita .................................. 362/61

Primary Examiner—Carroll B. Dority
Attorney, Agent, or Firm—Sughrue, Mion, Zinn, Macpeak & Seas

[57] ABSTRACT

In a automotive headlamp having a discharge bulb as a light source, a lighting circuit receiving chamber is formed in the rear of a lamp body, a discharge bulb lighting circuit is fixed in the lighting circuit receiving chamber through resin molding, and an inner flange-like guide portion is formed in the lighting circuit receiving chamber to act as a reference member to set a liquid surface position of poured molten resin in pouring the resin. Also, the inner flange-like guide portion abuts against the surface of the molded resin portion to thereby prevent the molded resin portion from separating from the lighting circuit receiving chamber.

18 Claims, 5 Drawing Sheets

AUTOMOTIVE HEADLAMP

BACKGROUND OF THE INVENTION

The present invention relates to a automotive headlamp in which a discharge bulb is used as a light source.

In the field of automotive headlamps, much recent attention has been paid to discharge bulbs in view of their good luminous efficiency and color properties as well as their long lifetime. Development activities directed to using discharge bulbs as automotive headlamps have been actively pursued.

A lighting circuit for applying a high voltage across the opposing electrodes of a discharge bulb is required for actuating the discharge bulb to start the discharge. As shown in FIG. 8, a headlamp employing a discharge bulb has a structure in which a lighting circuit receiving casing 3 for housing a lighting circuit 4 therein is attached to the rear portion of a lamp body 1 in which a discharge bulb 2 is inserted. Various electronic components are mounted on a printed circuit board 5 within the lighting circuit 4.

In the prior art arrangement described above, however, the printed circuit board 5 is mounted in the casing 3 through screws or by bonding with an adhesive, so that the electronic components constituting the lighting circuit 4 are subject to vibration and the entry of moisture.

SUMMARY OF THE INVENTION

The present invention has been attained in view of the problems in the prior art, and an object thereof is to provide an automotive headlamp in which a discharge bulb is used as a light source, and which is characterized in that a lighting circuit required to light the discharge bulb is housed in a lighting circuit receiving chamber in the rear of a lamp body preferably having good waterproofing and vibration resisting properties.

In order to attain the above and other objects, in a automotive headlamp of the invention having a discharge bulb as a light source, a lighting circuit receiving chamber is formed in the rear of a lamp body, a discharge bulb lighting circuit is resin-molded in the lighting circuit receiving chamber, and an inner flange-like guide portion is formed in the lighting circuit receiving chamber in such a manner that the inner flange-like guide portion acts as a reference member to set a liquid surface position for poured resin, and abutting against the surface of a molded resin portion to thereby prevent the molded resin portion from separating from the lighting circuit receiving chamber.

In accordance with a further aspect of the invention, the lighting circuit receiving chamber is constituted by a vessel-like lighting circuit receiving casing opening at its front surface, a cylindrical connection member which has a front end opening portion at which an engagement portion to be engaged with a bulb attaching/removing opening portion of the lamp body is formed, and a rear end opening portion at which the flange-like guide portion is formed, and which is integrally attached to the front opening portion of the lighting circuit receiving casing.

In accordance with yet another aspect of the invention, in an automotive headlamp having a discharge bulb as a light source, a lighting circuit receiving chamber is formed in a lamp housing, a discharge bulb lighting circuit is resin-molded in the lighting circuit receiving chamber, and an inner flange-like guide portion is formed in the lighting circuit receiving chamber to act as a reference member to set a liquid surface position for poured molten resin in pouring the resin, abutting against the surface of a molded resin portion to thereby prevent the molded resin portion from separating from the lighting circuit receiving chamber.

The lighting circuit receiving chamber may be constituted by a vessel-like lighting circuit receiving casing opening at its front surface, and a cylindrical connection member which has a front end opening portion at which an engagement portion to be engaged with a bulb attaching/removing opening portion of the lamp housing is formed, and a rear end opening portion at which the flange-like guide portion is formed, and which is integrally attached to the front opening portion of the lighting circuit receiving casing. The resin filled in the lighting circuit receiving chamber without any gaps ensures good waterproofing and vibration resisting properties for the lighting circuit.

As described above, the inner flange-like guide portion formed in the lighting circuit receiving chamber is made to act as a reference member for setting the level of the poured resin for molding. That is, the molten resin may be poured until the liquid surface of the poured resin becomes even with the surface of the guide portion. Further, the guide portion is made to abut against the molded resin portion at its front exposed portion to thereby prevent the molded resin portion from separating from the lighting circuit receiving chamber forming wall.

DESCRIPTION OF THE PREFERRED EMBODIMENTS

Figure 1:
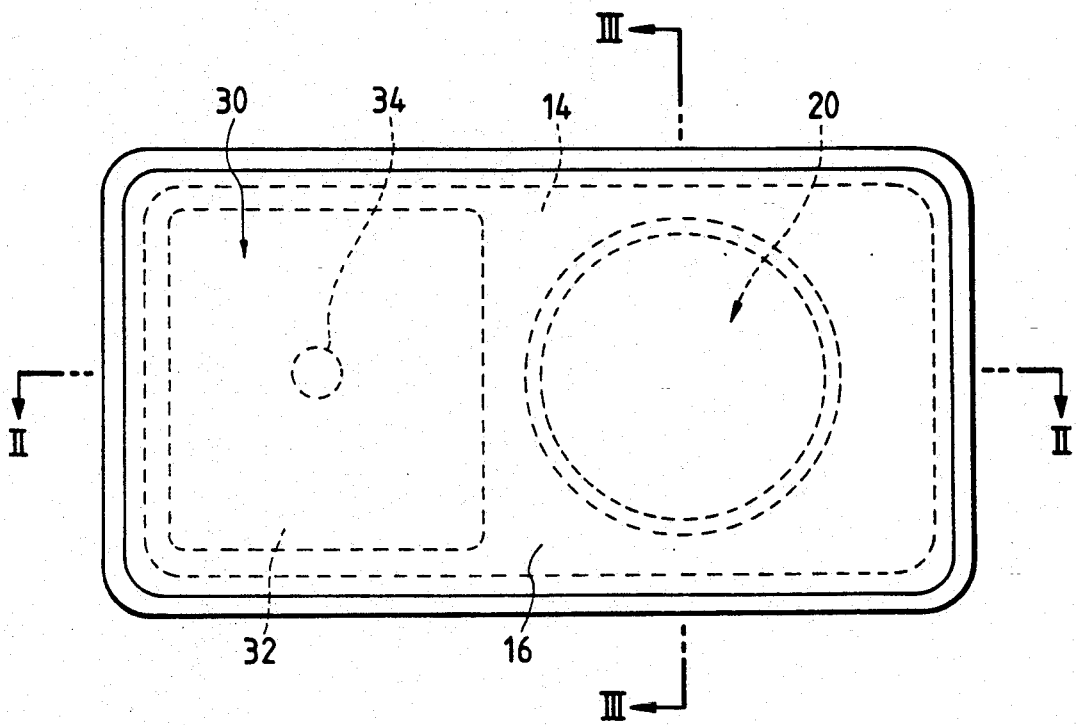
FIG. 1 is a front view of the automotive headlamp constructed in accordance with a first embodiment of the present invention.

Referring to the drawings, preferred embodiments of the present invention will be described hereunder.

Figure 5:
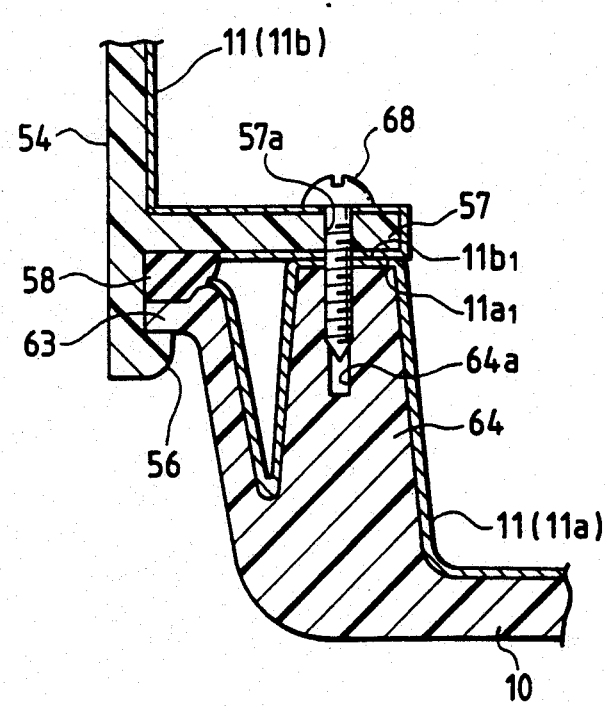
FIG. 5 is an enlarged sectional view of a portion of a bayonet engagement portion of a lighting circuit receiving unit and a lamp body side opening portion.
Figure 2:
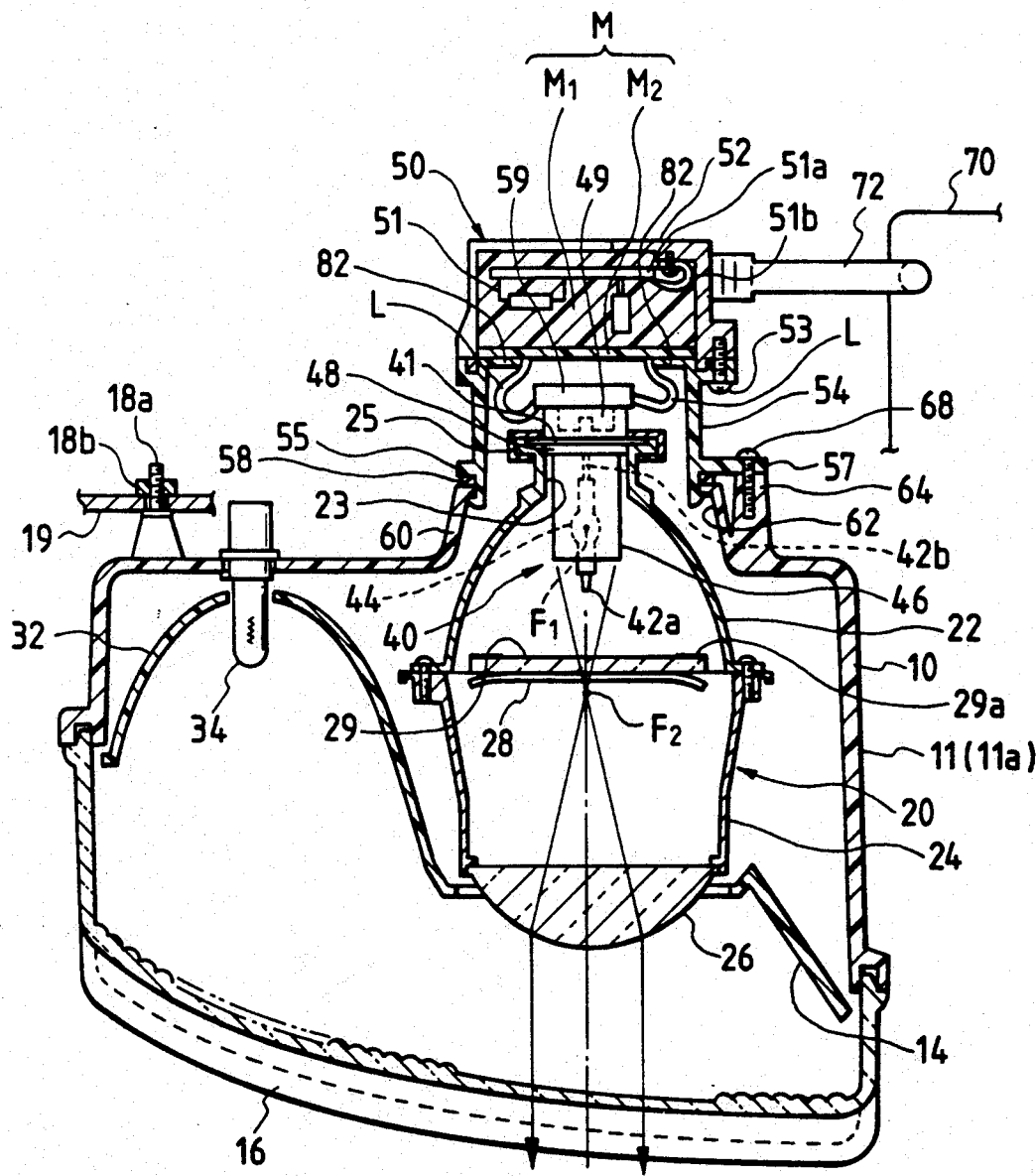
FIG. 2 is a horizontal sectional view of the headlamp of FIG. 1 taken on a line II—II shown in FIG. I.
Figure 3:
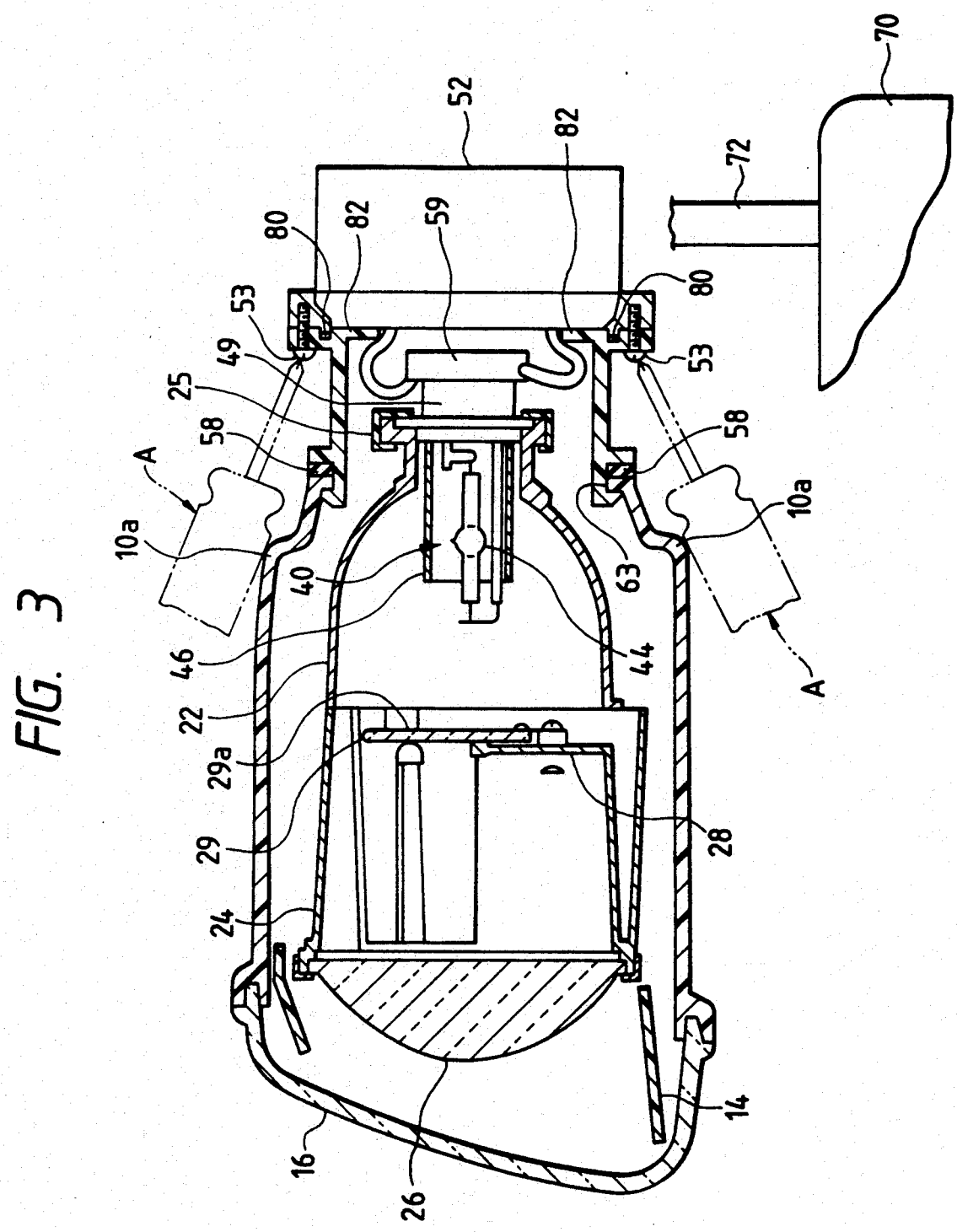
FIG. 3 is a vertical sectional view of the headlamp of FIG. 1 taken on a line III—III shown in FIG. 1.
Figure 4:
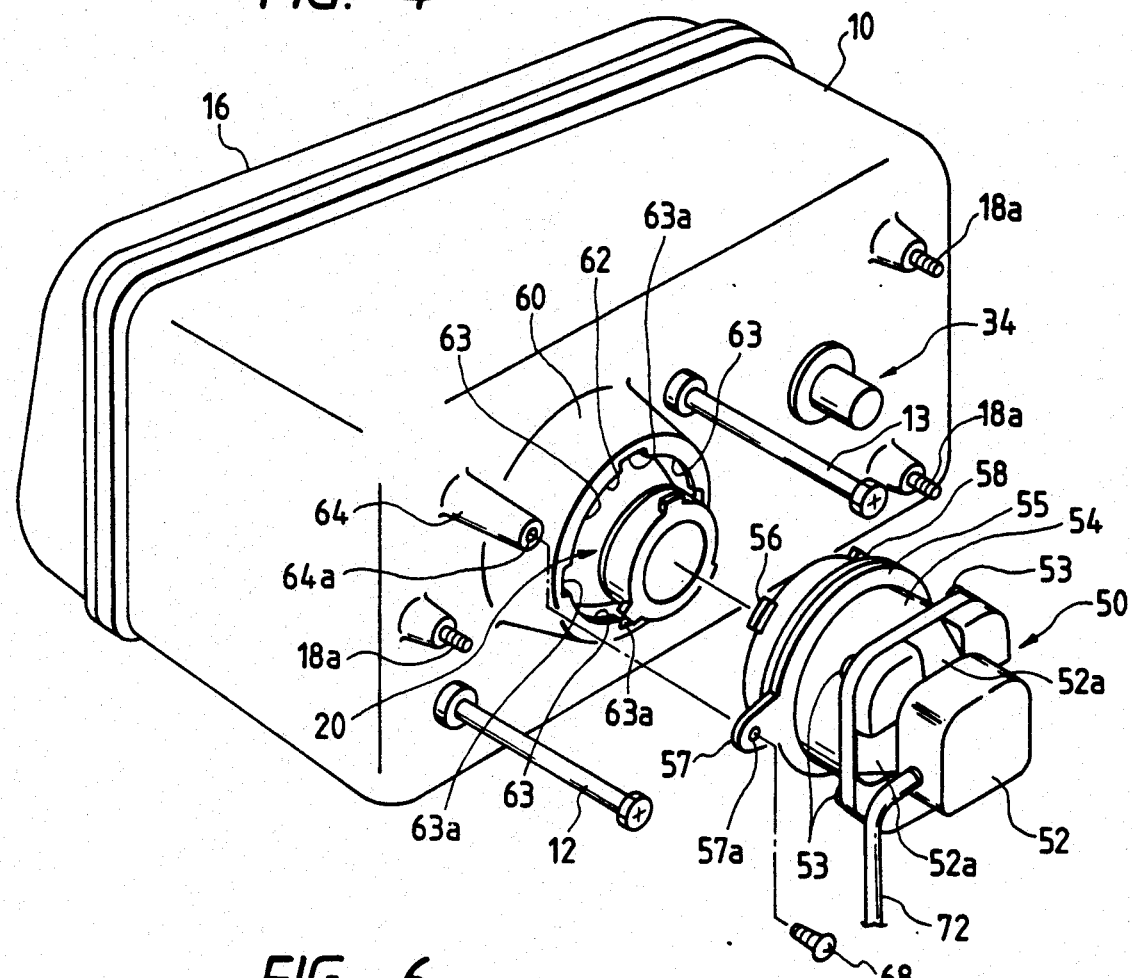
FIG. 4 is an exploded perspective view of the headlamp of FIG. 1 viewed from the rear side.
Figure 6:
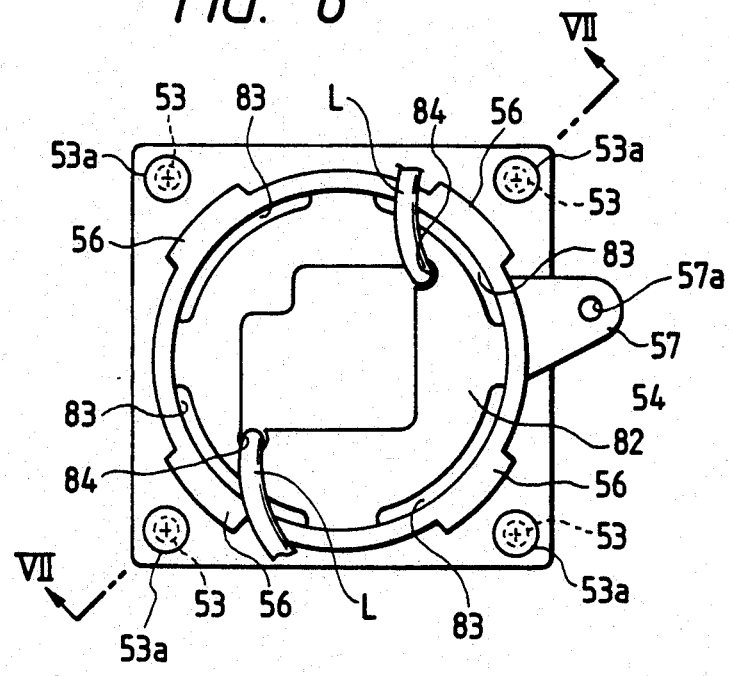
FIG. 6 is a front view of the lighting circuit receiving unit.
Figure 7:
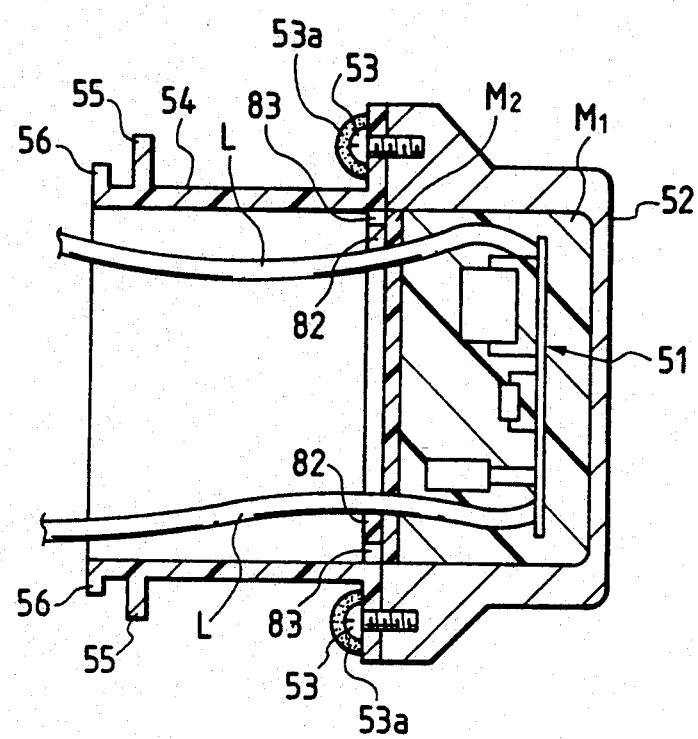
FIG. 7 is a vertical section of the lighting circuit receiving unit (a section taken on a line VII—VII shown in FIG. 6)
Figure 8:
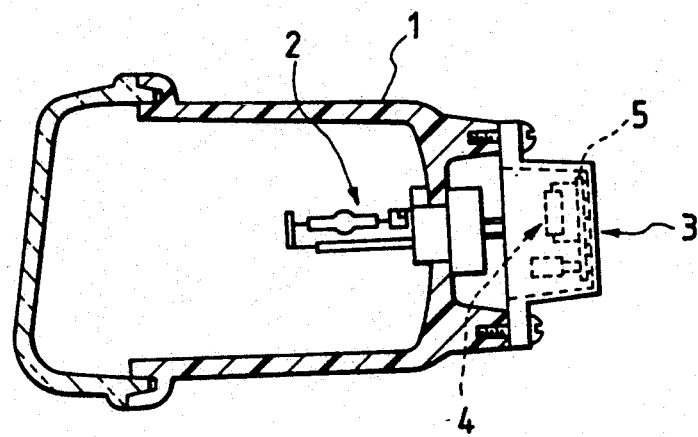
FIG. 8 shows a conventional headlamp employing a discharge bulb.

FIGS. 1 through 4 show a first preferred embodiment of the present invention. FIG. 1 is a front view of an automotive headlamp with which a clearance lamp is integrated, FIG. 2 is a horizontal section of the headlamp (a section taken on a line II—II shown in FIG. 1), FIG. 3 is a vertical section of the headlamp (a section taken on a line III—III shown in FIG. 1), FIG. 4 shows the headlamp shown from its rear side and is an exploded perspective view of the region of a lighting circuit receiving unit, FIG. 5 is an enlarged section of a portion connecting a lamp body side opening portion and the lighting circuit receiving unit, FIG. 6 is a front view of the lighting circuit receiving unit, and FIG. 7 is a vertical section of the lighting circuit receiving unit (a section taken on a line VII—VII shown in FIG. 6).

In the drawings, reference numeral 10 designates a vessel-like lamp body made of synthetic resin. A conductive layer 11 (11a) made of a conductive material such as Cu, Ni, Zn, or the like is formed on an outer surface of the lamp body 10 through a conductive coating, metallized contact treatment, or the like. The headlamp is fixed to a car body 19 with a nut 18b and a stud bolt 18a projected from the rear surface of the lamp body 10 (see FIG. 2), and the conductive layer 11a is electrically connected to the car body 19 through the stud bolt 18a made of a metallic good conductor.

A light projection unit 20 for forming the sub-beam (low beam) of the headlamp and a bulb 34 for a clearance lamp are provided adjacent to each other in a light chamber space constituted by the lamp body 10, and a front lens 16 is assembled with the lamp body at its front opening portion. The light projection unit 20 is slidably supported by an aiming mechanism constituted by two aiming screws 12 and 13 (see FIG. 4) supported by the lamp body 10 at its rear side and extending forward and a ball joint (not shown) supported by the lamp body. Reference numeral 14 designates a cover of synthetic resin which is lance-engaged with the lamp body 10 and which is provided around the light projection unit 20. The surface of the cover 14 is aluminum-deposition treated so as to form a mirror surface. A reflector 32 of a clearance lamp 30 is integrated with the cover 14 at its side, and the bulb 34 for the clearance lamp, which is inserted through a rear will of the lamp body 10, extends forward through the reflector 32.

The light projection unit 20 has a structure in which a substantially oval metallic reflector 22, a discharge bulb 40 inserted into a bulb insertion hole formed in the reflector at its rear top portion, and a metallic lens holder 24 to a front surface of which a projection lens 26 is fixed and which is attached to the front opening portion of the reflector 22 are integrated. Reference numeral 25 designates a locking cap used so that the discharge bulb 40 is fixedly held by the bulb insertion hole 23.

The discharge bulb 40 has a structure in which a discharge lamp 44 is supported by a pair of lead supports 42a and 42b which project in front of an insulating base 41. A discharge portion of the discharge lamp 44 is provided at a first fulcrum position $F_1$ of the reflector 22. Further, a cylindrical ultraviolet-ray shielding globe 46 enclosing the discharge lamp 44 is fixedly held by the base 41 at its front surface through a ceramic disk 48 so that, of the light emitted by the discharge portion, ultraviolet-rays in a harmful wavelength range are cut when the light penetrates the ultraviolet-ray shielding globe 46. A clear-cut forming shade 28 integrated with the lens holder 24 and an ultraviolet-ray shielding filter 29 fixedly held by the lens holder 24 through a metallic plate spring member 29a are provided in the vicinity of a second fulcrum position $F_2$ of the reflector 22. The light emitted by the discharge portion of the discharge lamp 44 is reflected on the reflector 22 and focused at the second fulcrum $F_2$ of the reflector 22. Then, the focused light is formed into parallel light and projected forward by the projection lens 26.

Reference numeral 50 designates a lighting circuit receiving unit in which a lighting circuit 51 for lighting the discharge bulb is housed in a casing, and which is attached to the rear portion of the lamp body 10. In the lighting circuit receiving unit 50, a lighting circuit 51 for applying a high voltage across the electrodes of the discharge lamp 44 so that the discharge lamp 44 continuously performs stable discharge is housed in a lighting circuit receiving chamber S of a casing 52 made of aluminum and integrated with the casing 52 through resin molding. Reference character M designates a molded resin portion filled around the lighting circuit 51. The lighting circuit 51 integrated with a printed circuit board is electrically connected to the car body through a ground circuit. The lighting circuit 51 is connected to a ballast circuit in a casing 70 provided under the headlamp through a connection cable 72 extending outside the lighting circuit receiving unit 50, and is further connected to the discharge bulb 40 through lead wires L. Reference numeral 59 designates a female connector which is connected to the lead wires L and which is connected to a male connector 49 on the discharge bulb side.

The molded resin portion M filled in the casing 2 so as to integrate the lighting circuit 51 with the casing is constituted by a molded resin portion $M_1$ filled in the circumference of the lighting circuit 51, primarily to reduce the weight of the casing 52, and a resin molded layer $M_2$ thinly formed on the surface layer portion of the molded resin portion $M_1$, primarily to obtain a good waterproofing property. In the molded resin portion $M_1$, a large number of hollow glass bodies are dispersed, so that the specific gravity of the whole of the molded resin portion $M_1$ is reduced. That is, the molded resin portion $M_1$ is made of a mixed material in which a resin material of epoxy, silicon, urethane, or the like as a main agent and a hardener is mixed with a hollow glass body material having a specific gravity smaller than that of the resin material and having a diameter of about 50 $\mu$m (for example, a product called "glass balloon" made by Sumitomo 3M, Ltd.) and a specific gravity of 0.15. The weight ratio of the hollow glass body material to be mixed with the resin material is preferably 7.5 parts by weight relative to 100 parts by weight of the resin material. This is because if a hollow glass body material having a weight ratio of not smaller than 8 is added, although the weight can be reduced, the viscosity of the whole of the resin becomes so high that the resin cannot sufficiently enter the gaps among the electronic parts constituting the lighting circuit, thereby causing a problem in obtaining a good waterproofing property and vibration resisting property. On the other hand, if the hollow glass body material has a weight ratio of not larger than 3, the weight cannot be reduced sufficiently. Accordingly, it is desirable that the amount of the hollow glass body material added to the resin material be selected so as to obtain a weight ratio in the range of from 3 to 8. In the case where the hollow glass body material of 5 parts by weight was added to the resin material of 100 parts by weight, the specific gravity of the whole of the molded resin portion was 1.14, although the specific gravity was 1.37 in the case where no hollow glass body material was added. Further, it is confirmed by the inventor that in the case where hollow glass body material in a weight ratio of 7.5 was added, the specific gravity of the whole of the molded resin portion was 0.98 (in the case of the present embodiment).

The resin molded layer $M_2$ in which no hollow glass body material is dispersed is formed in the thin lamination state on the molded resin portion $M_1$ in which the hollow glass bodies are dispersed. The resin molded layer $M_2$ is made of oily the resin material such as epoxy, silicon, urethane, or the like in which no hollow glass body material is mixed, to thereby obtain an extremely good waterproofing property. Thus, moisture is surely prevented from entering the resin molded layer $M_2$ formed on the molded resin portion $M_1$ and in which no hollow glass body material is mixed, so that the lighting circuit receiving unit 50 has no problems concerning moisture (humidity) resistance.

Further, the lighting circuit receiving unit 50 has a structure in which a synthetic-resin cylindrical extending portion 54, which is a connection member, is engaged through a rubber packing 80 with the front opening portion of the aluminum unit casing 52 in which the lighting circuit 51 is resin-molded, and the unit casing 52 and the cylindrical extending portion 54 are fastened together by four screws 53. An inner flange-like guide portion 82 for determining the quantity of the resin molded is formed on the side where the extending portion 54 is engaged with the unit casing 52. That is, when the extending portion 54 is integrally fastened to the unit casing 52 receiving the lighting circuit 51 and molten resin is poured into the casing 52 to perform molding, the molten resin may be poured up to the position where the liquid surface of the poured resin becomes even with the surface of the guide portion 82. Reference numeral 83 designates arc slits 83 formed on the circumferential edge portion of the guide portion 82 to remove bubbles when the molten resin is poured into the casing 52. Reference numeral 84 designates guide holes for respective lead wires. The guide portion 82 is made to abut against the front circumferential edge portion of the molded resin portion M so as to prevent the molded resin portion M from separating from the casing 52. That is, although a force tending to separate the molded resin portion M from the casing 52 can arise due to the inertia force of the molded resin portion M generated while the vehicle is moving or due to vibration transmitted from the vehicle, etc., the guide portion 82 acts to produce a reaction force acting against the force tending to separate the molded resin portion M, as a result of which the molded resin portion M is tightly held by the casing 52. Accordingly, there is no disadvantage that the molded resin portion M is separated from the casing 52 or rattles in the casing 52.

Reference numeral 53a designates a resin material covering the head of each of the screws 53 exposed outside the unit casing so as to prevent corrosion of the screw head portion.

The lighting circuit receiving unit 50 in which the lighting circuit 51 is thus resin-molded is bayonet-engaged at the front end portion of the extending portion 54 with a circular opening portion 62 formed in the lamp body 10 at its rear top portion, and is further fastened to the lamp body 10 by a tapping screw 68. That is, a cylindrical rearward projecting portion 60 projects from the rear wall of the lamp body 10 in the rear of the discharge bulb 40, the circular opening portion 62 for inserting the unit therein is formed in the rearward projecting portion 60, and inside protrusions 63 and notches 63a are formed on the circumferential edge portion of the opening portion 62 at three circumferentially equidistant positions. On the other hand, a flange 55 which abuts against the opening circumferential edge portion and three outside protrusions 56 to be bayonet-engaged with the inside protrusions 63 on the opening portion side are provided at the front end portion of the extending portion 54. When the outside protrusions 56 are positionally fitted in the notches 63a and inserted into the notches 63a, and the lighting circuit receiving unit 50 is rotated clockwise, the outside protrusions 56 are engaged with respective ones of the inside protrusions 63 in the forward/rearward direction of the headlamp to thereby obtain a state in which the extending portion 54 is temporarily attached to the opening portion 62.

A ring-like seal packing 58 is interposed between the outside protrusions 56 of the extending portion side and the inside protrusions 63 of the opening portion side so as to improve the adhesion of the bayonet engagement portion and to thereby seal the engagement portion. The unit casing 52 is made rectangular so as to be easily grasped by hand, and a concave portion 52a is formed in the unit casing 52 at its outer surface. A boss 64 in which a screw hole 64a is formed so as to project in the vicinity of the projecting portion 60 in which the opening portion 62 is formed. On the other hand, a plate-like protrusion 57 in which a screw hole 57a is formed is formed on the flange 55 of the extending portion 57. When the unit 50 is bayonet-engaged with the opening portion 62, the plate-like protrusion 57 is made to abut against the projecting end portion of the boss 64 so that the screw holes 64a and 57a coincide with each other. The tapping screw 68 is screwed from the screw hole 57a, so that the lighting circuit receiving unit 50 is fixed in the circular opening portion 62 in its circumferential direction.

The conductive layer 11 (11b) is formed on the outer surface of the circular extending portion 54 similarly to the lamp body 10, so that the electrical connection of the extended-portion-side conductive layer 11b and the lamp-body-side conductive layer 11a is ensured by the tapping screw 68. That is, as shown in FIG. 5, the conductive layer $11b_1$ formed on the surface of the outer protrusion 56 and the conductive layer 11a formed on the top end surface of the boss 64 are made to abut against each other by the tapping screw 68 to thereby ensure the electrical connection between the conductive layers 11a and 11b. The aluminum unit casing 52, which is made of a good conductor, and the conductive layer 11b on the extending portion 54 side ensure a good electrical connection therebetween through screws 53 used for fastening the casing 52 and the extending portion 54, and further by making the casing 52 abut against the conductive layer of a surface 54b of an outer flange portion 54a in which the screw insertion hole of the extending portion 54 is formed. The unit casing 52 is connected to a ground terminal 51a of a ground circuit in the lighting circuit 51 through a cable 51b. Accordingly, the conductive layers 11a and 11b enclosing the discharge bulb 40 and the discharge-bulb lighting circuit 51, respectively, and the aluminum unit casing 52 of the conductive layer are surely connected to the car body through the ground terminal 51a of the lighting circuit. Accordingly, electromagnetic interference waves produced by the discharge bulb 40, the lighting circuit 51, the lead wire L, etc., are led to the car body from the conductive layers 11a and 11b and the unit casing 52 through the ground circuit so as not to act as a noise source which could adversely affect the operation of other electric circuits. Further, the conductive layers 11a and 11b and the unit casing 52 are surely electrically connected to the car body through the stud bolt 18a, so that even if the electrical connection path through the ground terminal 51a of the lighting circuit is broken, any noise present is shielded by the electric connection path through the stud bolt 18a.

Further, even if electromagnetic waves are generated by other electrical equipment in the vicinity of the headlamp, such waves are shielded by the conductive layer 11 (11a and 11b) electrically connected to the car body and the aluminum unit casing 52 functioning as the conductive layer, so that the operation of the lighting circuit 32 in the lamp body 10 is protected from the effects of electromagnetic waves generated outside the headlamp.

The screws 53 for fastening the unit casing 52 to the extending portion 54 extend in the forward and rearward direction, and a portion 10a of the lamp body 10 which corresponds to the screws 53 is expanded outside to thereby provide a shape for preventing the removal of the screws 53 using a screwdriver A, as shown in FIG. 3. That is, it is difficult to remove the screws 53 by use of the screwdriver A in the state in which the lighting circuit receiving unit 50 is attached to the lamp body 10. When the bulb is lit, a high voltage is applied to the lighting circuit 51, so that it is extremely dangerous to touch the inside of the lighting circuit receiving unit 50. Accordingly, it is purposely made difficult to access the lighting circuit receiving unit 50 attached to the lamp body 10 so that a general user cannot easily tough dangerous portions, and thus the safety of the general user is assured.

Although the conductive layer 11a is formed on the outer surface of the lamp body made of synthetic resin in the embodiment described above, the conductive layer may be formed on an inner surface or both inner and outer surface of the lamp body. Further, although the unit casing 52 is made of aluminum, which is a good conductor, in the above embodiment, the unit casing 52 may be made of synthetic resin and a conductive layer formed on an outer surface and/or an inner surface of the synthetic resin. Moreover, in place of the formation of the conductive layer made of conductive material, the lamp body 10, the unit casing 52, and the extending portion 54 may be made of conductive resin, or the lamp body and extending portion may be made of conductive metal similarly to the unit casing 52.

Although the present invention has been described with reference to a projection type headlamp for distributing light by use of the light projection unit as an example in the embodiment described above, the present invention can be similarly applied a movable-unit type headlamp. Further, the present invention can be applied to a movable-reflector type headlamp in which a reflector is supported by an aiming mechanism relative to the lamp body, as described with respect to the above embodiment, or to a movable-unit type headlamp in which a lamp body-reflector unit in which an integrally formed lamp body and reflector are are movably supported by an aiming mechanism relative to a lamp receiving body.

As is believed apparent from the above description, in the automotive headlamp according to the present invention, the molded resin portion filled in the lighting circuit receiving chamber with no gaps ensures a good waterproofing property and vibration resisting property, so that a headlamp having the desired waterproofing property and vibration resisting property can be obtained.

Further, the inner flange-like guide portion formed in the lighting circuit receiving chamber is used as a reference position for the pouring of molten resin, that is, molten resin may be poured to the position where the liquid surface becomes even with the surface of the guide portion, so that molten resin in a suitable quantity can be always poured.

Still further, the guide portion is made to abut against the molded resin portion at its front exposed portion to thereby prevent the molded resin portion from separating from a lighting circuit receiving chamber forming wall, so that the adhesion of the molded resin portion in the lighting circuit receiving chamber is ensured, and thus a good waterproofing property and vibration resisting property are maintained over long periods of time.

What is claimed is:

1. In an automotive headlamp having a lamp body and employing a discharge bulb as a light source, the improvement wherein: a lighting circuit receiving chamber is provided at the rear of said lamp body, a discharge bulb lighting circuit is resin-molded in said lighting circuit receiving chamber, and an inner flange-like guide portion is formed in said lighting circuit receiving chamber acting as a reference member to set a surface position of molten resin forming a molded resin portion in said lighting circuit receiving chamber, said guide portion abutting against a surface of said molded resin portion thereby to prevent said molded resin portion from separating from said lighting circuit receiving chamber.

2. The automotive headlamp according to claim 1, wherein said lighting circuit receiving chamber comprises a vessel-like lighting circuit receiving casing opening at a front surface thereof, and a cylindrical connection member having a front end opening portion at which an engagement portion to be engaged with a bulb attaching/removing opening portion of said lamp body is formed, and a rear end opening portion at which said flange-like guide portion is formed, and which is integrally attached to said front opening portion of said lighting circuit receiving casing.

3. The automotive headlamp according to claim 1, wherein said molded resin portion comprises a first, inner portion formed of a resin material in which is dispersed a hollow glass body material, and a second, outer portion formed only of a resin material for providing a good waterproofing property.

4. The automotive headlamp according to claim 3, wherein said hollow glass body material has a specific gravity smaller than a specific gravity of said resin material.

5. The automotive headlamp according to claim 4, wherein said hollow glass body material comprises hollow glass bodies having a diameter on the order of 50 $\mu$m.

6. The automotive headlamp according to claim 4, wherein a weight ratio of said hollow glass body material to said resin material in said first portion is in a range of 3 to 8.

7. The automotive headlamp according to claim 2, wherein said lighting circuit receiving casing is formed of aluminum, and said cylindrical connection portion is formed of a resin material coated on at least one surface thereof with a conductive coating, said conductive coating being in electrical contact with said aluminum casing.

8. The automotive headlamp according to claim 7, wherein said lamp body is coated on at least one surface thereof with a conductive coating, said conductive coating of said cylindrical portion being in electrical contact with said conductive coating of said lamp body.

9. The automotive headlamp according to claim 7, wherein said cylindrical member is held to said aluminum casing through screws located so as to be inaccessible with a removal tool.

10. In an automotive headlamp having a lamp housing and employing a discharge bulb as a light source, the improvement wherein: a lighting circuit receiving chamber is formed in said lamp housing, a discharge bulb lighting circuit is resin-molded in said lighting circuit receiving chamber, and an inner flange-like guide portion is formed in said lighting circuit receiving chamber acting as a reference member to set a surface position of molten resin forming a molded resin portion in said lighting circuit receiving chamber, said guide portion abutting against a surface of said molded resin portion thereby to prevent said molded resin portion from separating from said lighting circuit receiving chamber.

11. The automotive headlamp according to claim 10, wherein said lighting circuit receiving chamber comprises a vessel-like lighting circuit receiving casing opening at a front surface thereof, and a cylindrical connection member having a front end opening portion at which an engagement portion to be engaged with a bulb attaching/removing opening portion of said lamp housing is formed, and a rear end opening portion at which said flange-like guide portion is formed, and which is integrally attached to said front opening portion of said lighting circuit receiving casing.

12. The automotive headlamp according to claim 10, wherein said molded resin portion comprises a first, inner portion formed of a resin material in which is dispersed a hollow glass body material, and a second, outer portion formed only of a resin material for providing a good waterproofing property.

13. The automotive headlamp according to claim 12, wherein said hollow glass body material has a specific gravity smaller than a specific gravity of said resin material.

14. The automotive headlamp according to claim 13, wherein said hollow glass body material comprises hollow glass bodies having a diameter on the order of 50 $\mu$m.

15. The automotive headlamp according to claim 13, wherein a weight ratio of said hollow glass body material to said resin material in said first portion is in a range of 3 to 8.

16. The automotive headlamp according to claim 11, wherein said lighting circuit receiving casing is formed of aluminum, and said cylindrical connection portion is formed of a resin material coated on at least one surface thereof with a conductive coating, said conductive coating being in electrical contact with said aluminum casing.

17. The automotive headlamp according to claim 16, wherein said lamp housing is coated on at least one surface thereof with a conductive coating, said conductive coating of said cylindrical portion being in electrical contact with said conductive coating of said lamp housing.

18. The automotive headlamp according to claim 16, wherein said cylindrical member is held to said aluminum casing through screws located so as to be inaccessible with a removal tool.

* * * * *